US010320869B2

(12) United States Patent
Lohmar et al.

(10) Patent No.: US 10,320,869 B2
(45) Date of Patent: Jun. 11, 2019

(54) NETWORK-CAPACITY OPTIMIZED ADAPTIVE HTTP STREAMING

(75) Inventors: Thorsten Lohmar, Aachen (DE); Torbjorn Einarsson, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 456 days.

(21) Appl. No.: 14/130,982

(22) PCT Filed: Jul. 7, 2011

(86) PCT No.: PCT/EP2011/003390
§ 371 (c)(1),
(2), (4) Date: Jan. 6, 2014

(87) PCT Pub. No.: WO2013/004260
PCT Pub. Date: Jan. 10, 2013

(65) Prior Publication Data
US 2014/0149557 A1    May 29, 2014

(51) Int. Cl.
G06F 15/16    (2006.01)
H04L 29/06    (2006.01)

(52) U.S. Cl.
CPC .......... *H04L 65/60* (2013.01); *H04L 65/4084* (2013.01); *H04L 65/605* (2013.01); *H04L 65/80* (2013.01)

(58) Field of Classification Search
CPC ... H04L 65/60; H04L 65/4084; H04L 65/605; H04L 65/80
(Continued)

(56) References Cited

U.S. PATENT DOCUMENTS 6,389,473 B1 * 5/2002 Carmel .................. H04L 29/06
                                                    709/231
8,184,947 B2 * 5/2012 Murabayashi .... G06F 17/30811
                                                    386/231
(Continued)

FOREIGN PATENT DOCUMENTS

CN    101621351 A    1/2010

OTHER PUBLICATIONS

First Office Action dated Nov. 4, 2015 in corresponding Chinese application No. 201180072161.6, 7 pages.
(Continued)

Primary Examiner — Liang Che A Wang
Assistant Examiner — Kaylee J Huang
(74) Attorney, Agent, or Firm — Rothwell, Figg, Ernst & Manbeck, P.C.

(57) ABSTRACT

The present disclosure relates to a technique of adjusting the download of one or more adjustable content streams, the one or more content streams are provided in a network by a server (200) for streaming the one or more content streams to one or more clients (100a, 100b) and each of the one or more content streams comprises a plurality of content segments. A method embodiment comprises the steps of: generating a manifest file comprising one or more media bit rate candidates each of which indicating an encoded media data rate of the content segments of the one or more content streams, wherein the media data rate candidates are generate by considering a perceived quality of the one or more content streams; and manipulating the manifest file by adjusting at least one of the one or more media data rate candidates based on the available data rate between the server (200) and the one or more clients (100a, 100b) for downloading the content segments.

17 Claims, 8 Drawing Sheets

(58) Field of Classification Search
USPC .............. 709/203, 217, 219, 223, 224, 226
See application file for complete search history.

(56) References Cited

U.S. PATENT DOCUMENTS

| | | | |
|---|---|---|---|
| 2008/0002771 A1* | 1/2008 | Chen | H04N 19/139 375/240.16 |
| 2009/0034426 A1* | 2/2009 | Luft | H04L 12/2602 370/252 |
| 2010/0195521 A1* | 8/2010 | Wanstedt | H04L 47/10 370/252 |
| 2010/0257572 A1* | 10/2010 | Sridhar | H04L 12/1822 725/116 |
| 2010/0268836 A1* | 10/2010 | Jabri | H04L 47/38 709/231 |
| 2011/0082924 A1* | 4/2011 | Gopalakrishnan | H04L 65/4084 709/223 |
| 2011/0090922 A1 | 4/2011 | Wang et al. | |
| 2011/0314130 A1* | 12/2011 | Strasman | H04L 29/06 709/219 |
| 2012/0005361 A1* | 1/2012 | Knittle | H04L 12/66 709/231 |
| 2012/0023155 A1* | 1/2012 | Myers | H04N 21/234327 709/203 |
| 2012/0042050 A1* | 2/2012 | Chen | H04L 65/604 709/219 |
| 2012/0042090 A1* | 2/2012 | Chen | H04L 65/604 709/231 |
| 2012/0047542 A1* | 2/2012 | Lewis | H04N 21/44016 725/97 |

OTHER PUBLICATIONS

Thakolsri, S., et al., "QoE-Driven Cross-Layer Optimization for High Speed Downlink Packet Access", Journal of Communications, vol. 4, No. 9, Oct. 2009, pp. 669-680.

3GPP TS 26.234 V9.0.0 (Sep. 2009), 3rd Generation Partnership Project; Technical Specification Group Services and System Aspects; Transparent end-to-end Packet-switched Streaming Service (PSDS); Protocols and codecs (Release 9), 167 pages.

Thakolsri, S., et al., "QoE-based Rate Adaptation Scheme Selection for Resource-constrained Wireless Video Transmission", Proceedings of MM'10, ACM, Oct. 25-29, 2010, Firenze, Italy, pp. 783-786.

* cited by examiner

NETWORK-CAPACITY OPTIMIZED ADAPTIVE HTTP STREAMING

CROSS-REFERENCE TO RELATED APPLICATION

This application is a 35 U.S.C. § 371 National Phase Entry Application from PCT/EP2011/003390, filed Jul. 7, 2011, and designating the United States.

TECHNICAL FIELD

The invention generally relates to the field of content streaming. More specifically, the invention relates to a technique of adjusting the download of one or more adjustable content streams.

BACKGROUND

Streaming technologies are used for delivering media, e.g. multimedia, provided by a streaming provider to an end-user such that the media is constantly received by and presented to the end-user. Hypertext Transfer Protocol (HTTP) streaming is a mechanism for sending data from a web server to a web browser. HTTP streaming (also known as HTTP server push or push technology) can be achieved through several mechanisms.

Adaptive HTTP streaming is becoming the dominant content streaming technique. Adaptive Streaming (or Adaptive Bitrate Streaming) is a technique used in streaming multimedia over networks like computer networks. Today's adaptive streaming technologies are almost exclusively based on HTTP and designed to work efficiently over large distributed HTTP networks such as the Internet. In principal, adaptive streaming works by detecting a user's bandwidth and CPU capacity in real time and adjusting the quality of a video stream accordingly. It requires the use of an encoder which can encode a single source video at multiple bit rates. The player client switches between streaming the different encodings depending on available resources.

A number of different techniques exist such as Apple's HTTP Live Streaming (HLS), Microsoft's Smooth streaming (ISM) and 3GP/Moving Picture Expert Group (MPEG) DASH.

Those adaptive HTTP streaming technique all have common principles: The client receives the content stream as a sequence of files, or as a sequence of byte-range requests, which is then decoded and played as a continuous media stream. The Uniform Resource Locators (URLs) of the file sequence are described in a manifest file, which is an .m3u8 playlist in case of Apple's HLS, an .ismc in case of Microsoft's ISM and an .MPD in case of DASH.

The main principles of adaptive HTTP streaming are illustrated in FIG. 1. At first, the client 1 requests the manifest file from the server 2 by means of a "HTTP GET manifest file" request. Then, the server 2 transmits the manifest file to the client 1. The client 1 processes the manifest file and requests the first segment (e.g., with the lowest available media data rate (the lowest available quality)), as specified in the manifest file, from the server 2. During download of the manifest file, the client 1 measures the download speed and uses this estimation to select an appropriate representation (an appropriate quality) for the next (second) segment. For example, the client 1 selects a medium available media data rate (a medium available quality). The next segment is downloaded by the client 1 with a data rate slightly higher than the media data rate of the segment (otherwise, the media like a video will frequently stop playing). During the download of the second segment, the client 1 again measures the download speed.

In short, the client fetches one media segment (file) after each other as described in the manifest file. During file download, the client estimates the available link bitrate (download speed). Depending on the difference between the available link bitrate and the encoded bitrate of the media, the client selects an appropriate quality representation (normally slightly lower than the measured link bitrate).

To prepare a continuous stream of content for adaptive HTTP streaming, the stream is segmented into media segments (files) on the server side. These media segments are fetched by the client one-by-one as independent files. The client plays the segments contiguously and thereby provides a continuous stream playout. This is also illustrated in FIG. 2.

Adaptive HTTP streaming servers provide the clients with a list of different representations (typically bitrates) to choose from on a fragment basis, so as to be able to adapt the media bitrate to the available link bitrate. This is a client-centric approach, and aims at providing an interrupt-free viewing experience on the client screen, and does not take into account other clients.

Active clients (per cell or limiting link) will adapt to the link bitrate they experience, and adapt to approximately equal average media bitrates.

However, the perceived media quality (e.g., perceived video quality) as experienced by a user of the client does not only depend on the bitrate, but also very much on the type of media content. For example, sports content typically requires double the media bitrate compared to talk-shows, to achieve the same perceived quality in terms of subjective video quality. Subjective media quality measures are used to deal with subjective characteristics of media (e.g., video) quality. These measures are concerned with how media, like video, is perceived by a viewer and designates his or her opinion on a particular video sequence. There are different ways for measuring the perceived quality. One way is the so-called Mean Opinion Score (MOS).

The MOS is generated by averaging the results of a set of standard, subjective tests where a number of listeners rate the viewed video quality (or the heard audio quality) of test sequences. A viewer is required to give each sequence a rating using the following rating scheme: 5=Excellent, 4=Good, 3=Fair, 2=Poor, 1=Bad. The MOS is the arithmetic mean of all the individual scores, and can range from 1 (worst) to 5 (best).

As stated above, different media contents require different bit rates in order to be perceived as having the same quality. For example, sports content typically requires double the media bitrate compared to talk-shows, to achieve the same MOS. However, with since all adaptation is done in the client, on an individual basis, there is no way that content of those sessions that require higher media bit rate will also get a higher link bit rate.

In this context, FIG. 3 illustrates two mobile clients 1a, 1b. A first mobile client 1a currently downloads sports content from a server 2 via an available link. A second mobile client 1b currently downloads talk-show content from the server 2 via the same available link. Both contents, i.e. the sports content and the talk-show content are downloaded with the same download speed (bit rate). In other words, the available bit rate is shared equally between the two different content streams. In consequence, although the different content streams are downloaded with the same bit rate, the perceived quality of the sports content will presumably be worse than the perceived quality of the talk-show content, as the sports content requires a higher bit rate in order to achieve the same perceived quality as the talk-show content.

For adaptive streaming in general, it has been proposed in "QoE-Driven Cross-Layer Optimization for High Speed Downlink Packet Access", Journal of Comm., Vol. 4, No. 9, 2009, that one shall do a Quality of Experience (QoE)-driven Cross-Layer optimization using a utility function for each content that maps bitrate to MOS. One can thereby maximize the number of satisfied users in a mobile network.

Furthermore, in "QoE-based rate adaptation scheme selection for resource-constrained wireless video transmission", Proceedings of MM '10, ACM media is transcoded in the network to be based on such utility functions to optimize the total perceived video quality. However, this scheme is not directly applicable for the case of adaptive HTTP streaming, where the client is choosing the version of the media that corresponds best to the available bandwidth.

SUMMARY

Accordingly, there is a need for an improved adaptive streaming technique.

According to a first aspect, a method of adjusting the download of one or more adjustable content streams is provided. The one or more content streams are provided in a network by a server for streaming the one or more content streams to one or more clients and each of the one or more content streams comprises a plurality of content segments. The method comprises the steps of: generating a manifest file comprising one or more media bit rate candidates each of which indicating an encoded media data rate of the content segments of the one or more content streams, wherein the media data rate candidates are generated by considering a perceived quality of the one or more content streams; and manipulating the manifest file by adjusting at least one of the one or more media data rate candidates based on the available data rate between the server and the one or more clients for downloading the content segments.

In this context, the term "media data rate" defines the data rate (e.g., bit rate) used for encoding the content (e.g. media or multimedia content) of the one or more content streams, like video or audio data. In this way, the term "media data rate candidates" defines possible media data rates for encoding the content, i.e. the used encoder is able to encode the content at the media data rate candidates. In contrast, the term "available data rate" defines the data rate (e.g., bit rate) between the server and the one or more clients, i.e. the available transmission/link data rate for the link (connection) from the server to the one or more clients. The available data rate is correlated to the available bandwidth of the connection from the server to the one or more clients.

By means of the method according to the first aspect it is possible for the server side (e.g., an operator or a service provider) to influence the data rate (download speed) the one or more clients can select for downloading the one or more content streams. The one or more clients may be at least one of a mobile client and a stationary client.

The one or more content streams may comprise any kind of media content, like video content, audio content or other multimedia content. The perceived quality of the one or more content streams may be the average subjective quality as perceived by users of the one or more content streams. In this regard, the perceived quality may be subjective video quality or the subjective audio quality of the one or more content streams. For example, the perceived quality may be the Perceived Quality of Service (PQoS) (also named Quality of Experience (QoE)), in the sense of the Quality of Service (QoS) as it is finally perceived by the user (e.g., viewer, listener). Different metrics may be used as a measure for the perceived quality of the content (e.g., media) contained in the one or more content streams.

For example, the perceived quality of the one or more content streams may comprise a Mean Opinion Score (MOS) or any other subjective quality metrics of the one or more content streams.

The method may further comprise the step of determining the available data rate (download speed) between the server and the one or more clients for downloading the content segments. In this respect, the available bit rate at the link between the server and the client currently downloading the one or more content streams may be determined as the available data rate, e.g. the available bit rate at the link from the server to the one or more clients. For example, the overall bandwidth between the server and the one or more clients may be considered for determining the available data rate.

The available data rate may be determined based on at least one of real-time statistics and long term statistics. For example, the real-time statistics indicate the current (actual) load between the server and the one or more clients. The long term statistics may indicate a typical (or an average) load between the server and the one or more clients during a predetermined time period. For example, the long term statistics may indicate that certain cells or links of the network are typically loaded to a certain percentage during the predetermined time period, e.g. one hour, two hours or any other number of hours during a day.

The manifest file may comprise a plurality of media data rate candidates for each of the content segments of each of the one or more content streams. For instance, the manifest file may comprise two, three, four or more media data rate candidates for each of the content segments. The same values may be used for the plurality of media data rate candidates for each of the content segments of one particular content stream. Alternatively, media data rate candidates for the content segments of the same content stream may comprise different values. For example, it is conceivable that the values for the plurality of media data rate candidates are different for subsets of the content segments of one particular content stream, e.g., a subset or all of the content segments have different values for the plurality of media data rate candidates. However, in normal operation, the values of the media data rate candidates may be the same for different content segments of the same content stream.

The media data rate candidates may be generated by considering the content of the one or more content streams, i.e. the media data rate candidates may be content dependent. For example, different values may be assigned to media data rate candidates of segments of different content streams. In this regard, a first subset of media data rate candidates related to one or more content streams may have a first set of values for the media data rate candidates and a second subset of media data rate candidates related to one or more content streams may have a second set of values for the media data rate candidates, wherein the second set of values is different from the first set of values.

Independent of the number and the values of the media data rate candidates, the step of adjusting the media data rate candidates in the step of manipulating the manifest file may comprise removing all media data rate candidates indicating an encoded media data rate which lies over a predetermined threshold. The predetermined threshold may have been determined before transmission of the one or more content segments. However, alternatively or additionally, the predetermined threshold may be determined/adjusted based on the available data rate between the server and the client. For example, the predetermined threshold may be increased when it is determined that the available data rate has increased. Likewise, the predetermined threshold may be decreased when it is determined that the available data rata has decreased.

In accordance with one variant of the method according to the first aspect, the media data rate candidates may be generated based on information indicating the type of the one or more content streams. The type of the one or more content streams may be a certain category into which the one or more content streams can be classified. For example, a first category may comprise media (e.g., video) content with high movements and a second category may comprise media (e.g., video) content with low movements (more static content). For example, sports content or music may be categorised into the first category as it contains higher movements than a certain movement threshold. Likewise, talk-shows or news may be categorized into the second category as it contains lower movements than the movement threshold. The first category may then contain higher values for the media data rate candidates than the second category. In other words, higher values for the media content types of the first category may be assigned to the media data rate candidates than for the media content types of the second category in order to achieve a similar or the same perceived quality.

According to a second variant of the method according to the first aspect, the media data rate candidates may be generated based on one or more perceived quality parameters. For example, it may be set in the manifest file that a first content stream has a first value as the perceived quality parameter. Similarly, a second value, lower than the first value, may be assigned to a second content stream as the perceived quality parameter. In this way, each content stream may be categorized according to a value of the perceived quality parameter. The values of the media data rate candidates may then be assigned based on the value of the perceived quality parameter. For example, lower values may be assigned to the media data rate candidates of the first content stream, as the first content stream has a higher perceived quality parameter and therefore usually requires a lower media data rate in order to achieve the same perceived quality as the second content stream. Likewise, higher values may be assigned to the media data date candidates of the second content stream, as the second content stream has a lower perceived quality parameter and therefore requires a higher data rate in order to achieve the same perceived quality as the first content stream. In this way, different content streams may have different perceived quality parameters, but similar or the same perceived quality.

The one or more perceived quality parameters may comprise MOS values which are used for all of the one or more perceived quality parameters for all of the one or more content streams. In this way, it can be ensured that the perceived quality can be equally distributed over all of the one or more content streams, i.e. all content streams are perceived to have the same quality (although some or all of the content streams have different media data rate candidates and may thus be downloaded at a different data rate (download speed)).

The one or more content streams may comprise at least one of a sports content stream, a news content stream, a talk show content stream, a music content stream, a music video content stream and a movie content stream.

The step of manipulating the manifest file may be repeatedly performed. For example, the step of manipulating the manifest file may be performed each time a content segment is/has been downloaded by the client. Alternatively, the step may not be performed after each download, but only if a change in the available link, e.g. a change in the available data rate between the server and the client has been determined.

The streaming between the server and the one or more clients may comprise or may be Hypertext Transfer Protocol (HTTP) streaming.

According to a second aspect, a computer program product is proposed, comprising program code portions for performing steps of any one of the method aspects described herein, when the computer program product is run on one or more computing devices. The computer program product may be stored on a computer readable recording medium.

In accordance with a third aspect, a network node for adjusting the download of one or more adjustable content streams is provided. The one or more content streams are provided in a network by a server for streaming the one or more content streams to one or more clients and each of the one or more content streams comprises a plurality of content segments. The network node comprises: a generating component for generating a manifest file comprising one or more media data rate candidates each of which indicating an encoded media data rate of the content segments of the one or more content streams, wherein the media data rate candidates are generated by considering a perceived quality of the one or more content streams; and a manipulating component for manipulating the manifest file by adjusting at least one of the one or more media data rate candidates based on the available data rate between the server and the one or more clients for downloading the content segments.

According to one realization of the network node according to the third aspect, the network node may comprise or may be the server providing the one or more content streams. In accordance with a second realization of the network node according to the third aspect which may be combined/may not be combined with the first realization, the network node comprises/may be an intermediate network node between the server and the one or more clients.

The intermediate network node may be a Deep Packet Inspection (DPI) node which is adapted to determine the available download speed by means of DPI. Alternatively, the intermediate network node may be a HTTP proxy.

According to a fourth aspect, a system for adjusting the download of one or more adjustable content streams is provided. The one or more content streams are provided in a network by a server for streaming the one or more content streams to one or more clients and each of the one or more content streams comprises a plurality of content segments. The system comprises the network node as described herein and a client. The client is adapted to request download of a content stream of the one or more content streams, to receive the manifest file, to download at least one of the content segments of the requested content stream by selecting a data rate for downloading the at least one content segment based on the media data rate candidates specified in the manifest file, to receive the manipulated manifest file and to download remaining ones of the content segments of the requested content stream by selecting a data rate for downloading the remaining ones of the content segments based on the media data rate candidates specified in the manipulated manifest file.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practiced in other embodiments that depart from these specific details. For example, the skilled artisan will appreciate that the current invention may be practiced with (subjective) perceived quality metrics different from the Mean Opinion Score (MOS) used below to illustrate the current invention. Further, although the examples below will be explained with respect to Hypertext Transfer Protocol (HTTP) streaming, other streaming techniques can be used instead or in addition. Also, the invention may be practiced in any network to which mobile or stationary users may attach. For example, the invention is applicable to, besides cellular networks, WLAN, Bluetooth, DVB or similar wireless networks, but also to wireline networks such as, for example, the intranet of a company with some or many separated subsidiaries or the Internet.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

The following examples are, without limitation, related to HTTP streaming. However, other streaming techniques may also be used. Although the following examples are related to "HTTP streaming", the shorter terminology "streaming" will be used instead.

Figure 4:
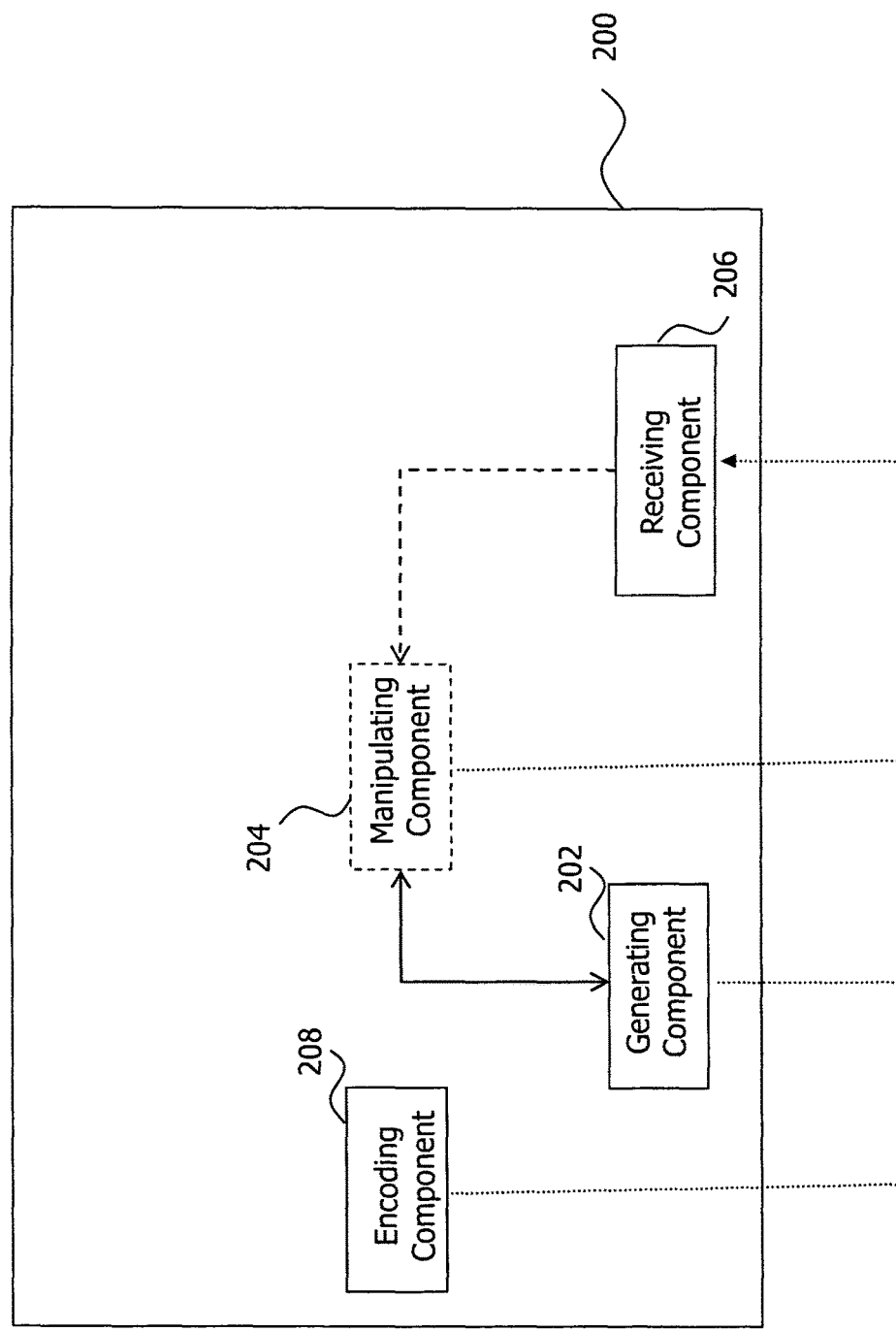
FIG. 4 is a schematic illustration of a first device embodiment.

FIG. 4 is a schematic illustration of a first device embodiment. In FIG. 4, a network node which is in FIG. 4 exemplarily illustrated as a server 200 comprises a generating component 202, a receiving component 206, an encoding component 208 and optionally also a manipulating component 204.

Figure 1:
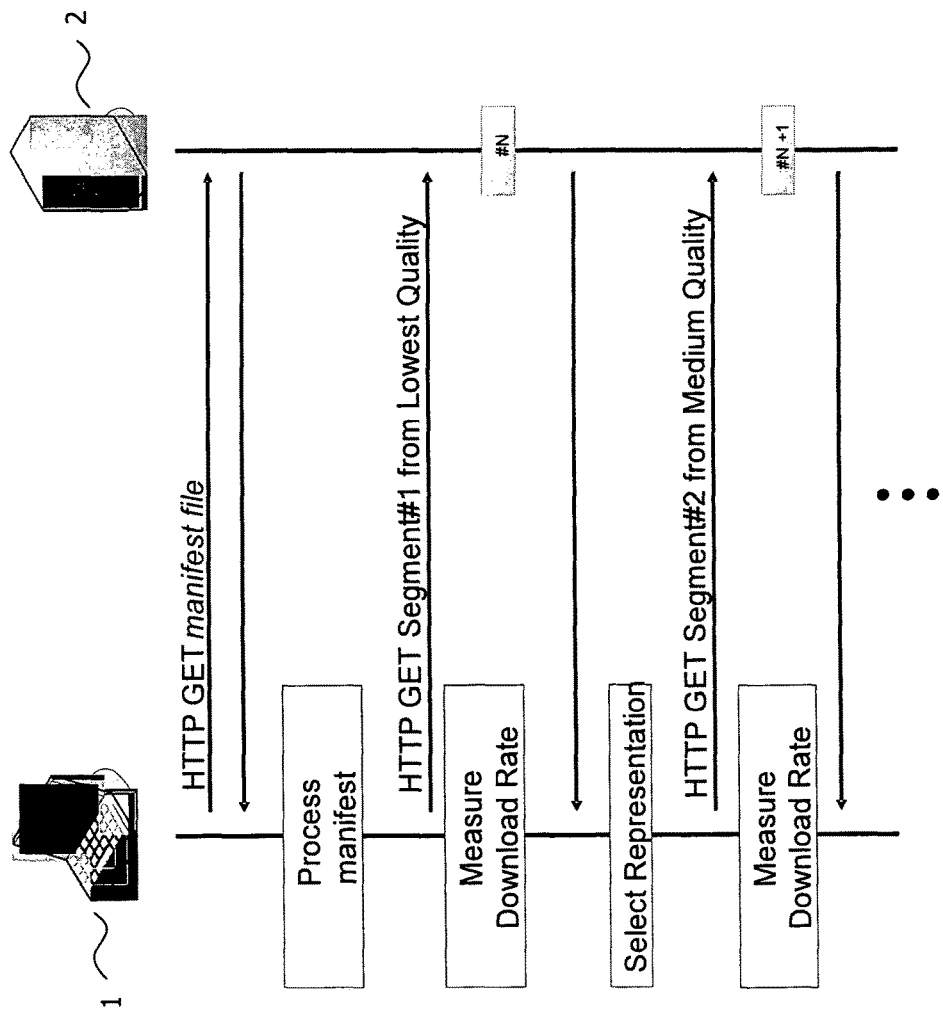
FIG. 1 is a schematic illustration of a known signaling scheme for transmitting a media content stream containing a plurality of media content segments as specified in a manifest file.
Figure 2:
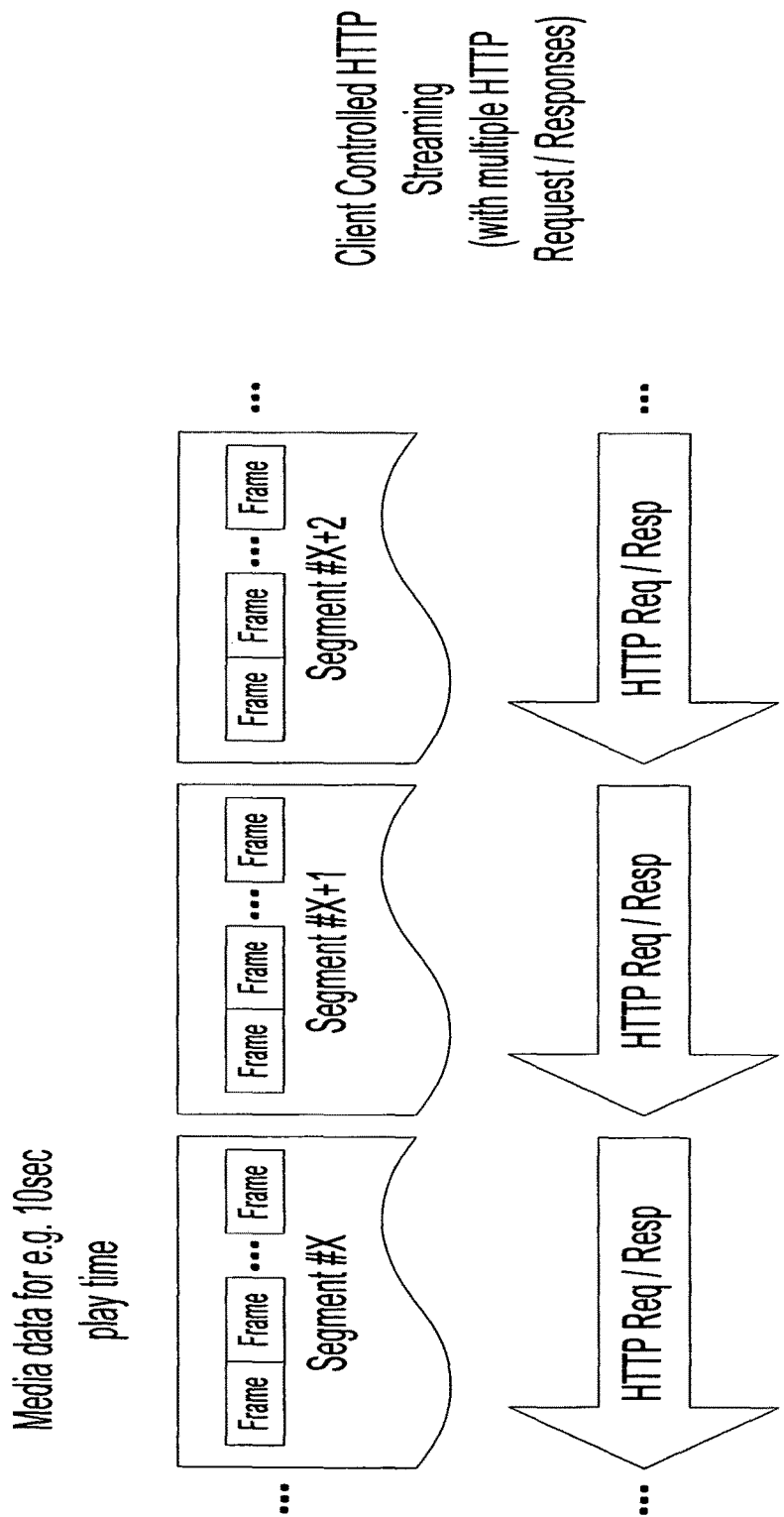
FIG. 2 is a schematic illustration of a media content stream containing a plurality of media content segments transmitted by means of the signaling scheme of FIG. 1.
Figure 3:
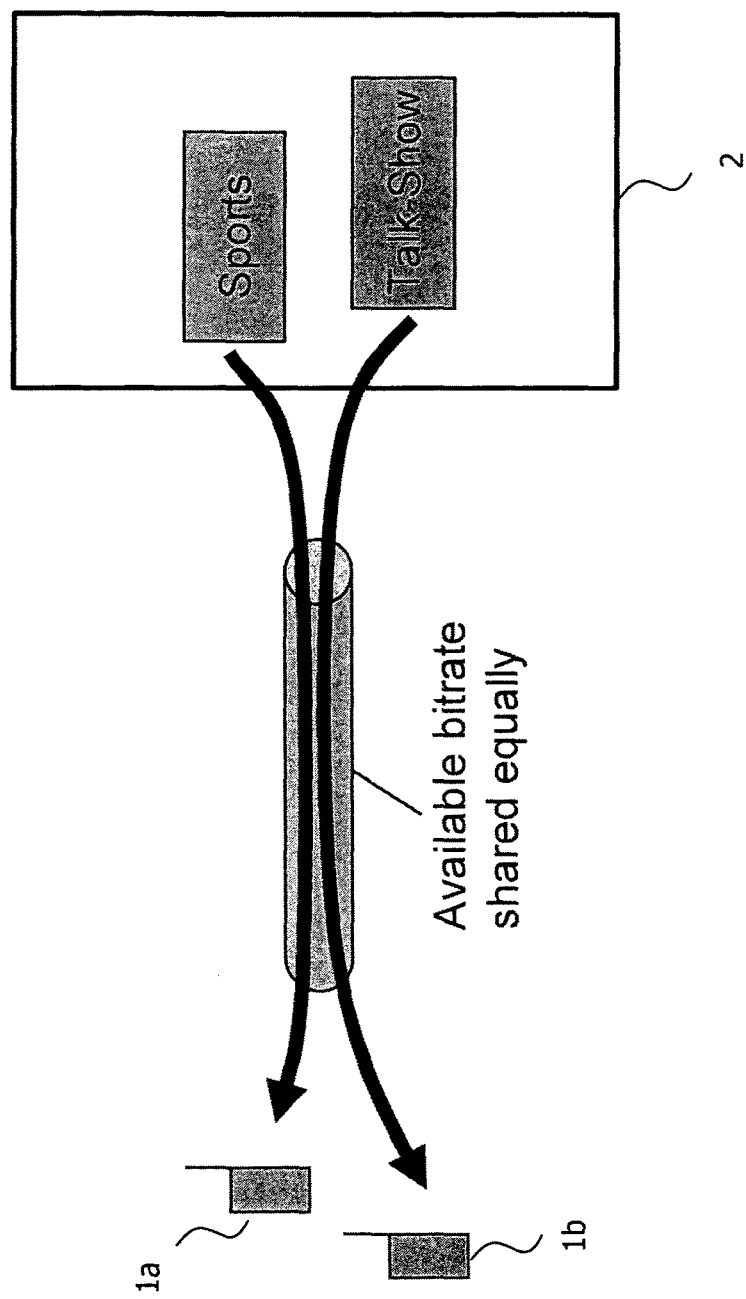
FIG. 3 is a schematic illustration of a known configuration for transmitting different media content.

The server 200 provides a network and in particular one or more clients in the network with several media content streams each of which comprising a plurality of content segments, as can be seen in FIGS. 1 and 2. For this purpose, the server 200 comprises the encoding component 208 which is adapted to encode the content streams (in particular the content segments of the content streams) at different media bit rates. The generating component 202 is adapted to generate and transmit manifest files. A Manifest file is a structure comprising a plurality of values (which are called media bit rate candidates in the following) indicating a media bit rate at which content segments of the media content streams can be encoded in the encoding component 208. The media content streams may be any kind of media or multimedia content streams, like video content streams, audio content streams or the like. In the following it is assumed without limitation that the content streams comprise video content streams. This is, however, merely exemplary, and the present invention is applicable to all types of (media or multimedia) content streams.

The manifest file is transmitted by the generating component 202 to a client which requests a content stream provided by the server 200. For receiving the request for a content stream provided by the server 200 from a client, the server 200 comprises a receiving component 206. In accordance with the request received by the receiving component 206, the generating component 202 can transmit the manifest file and the encoding component 208 can transmit the requested video content stream.

The video content streams are exemplarily provided by the server 200 shown in FIG. 4 and may not only be generated but also transmitted by the encoding component 208. However, the server 200 may comprise an additional/separate transmitting component for transmitting the content streams. Likewise, in the example of FIG. 4, the manifest file is generated and transmitted by the generating component 202. However, the server may alternatively comprise a separate transmitting component for transmitting the manifest file.

In the present exemplary configuration shown in FIG. 4, without limitation, the manifest file is generated and transmitted by the generating component 202 of the server and the content streams are encoded and transmitted by the encoding component 208.

The receiving component 206 is adapted to receive feedback information related to the available bit rate over the link from the server 200 to the one or more clients being in connection with the server 200. This will be explained in more detail below.

The feedback information will then be used by the manipulating component 204 to manipulate the manifest file originally generated by the generating component 202. The manipulating component 204 is, in the present example, exemplarily provided in the server 200. However, the present invention is not restricted thereto and the manipulating may be located in a network node different from the server, as will be explained in more detail below. Independent of where the manipulating component 204 is located, the manipulating component 204 is adapted to manipulate the manifest file by adjusting the media bit rate candidates, e.g. by adjusting the number of media bit rate candidates or the values of the media bit rate candidates or both the number and the values of the media bit rate candidates. For adjusting the media bit rate candidates the manipulating component 204 considers, as stated above, the available bit rate between the server 200 and the clients. In order to receive feedback regarding the available bit rate, the receiving component 206 is used which forwards the relevant information to the manipulating component 204.

Figure 5:
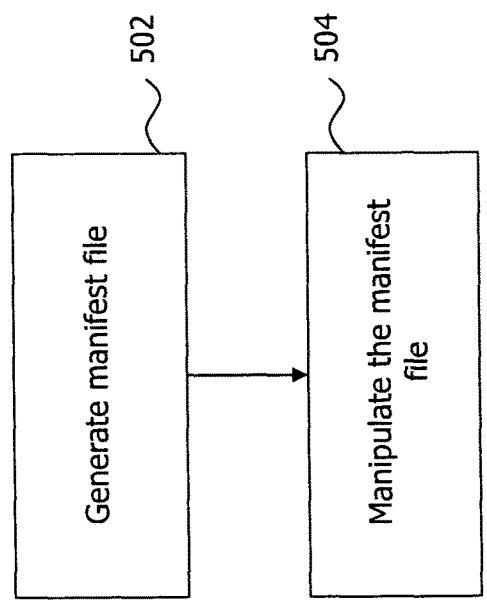
FIG. 5 is a schematic illustration of a first method embodiment.

FIG. 5 shows a flow diagram of a first method embodiment performed by the server 200 of FIG. 4. In step 502, in response from a client requesting download of one of the streams provided by the server 200, the generating component 202 of the server 200 generates a manifest file and forwards the manifest file to the client. As explained above, the manifest file comprises media bit rate candidates for the content segments. After receiving the manifest file by the client, the client starts downloading the content segments based on the media bit rate candidates indicated in the manifest file. In particular, the client selects one media bit rate of the given media data rate candidates and choses a bit rate for downloading the first segment which is slightly higher than the selected media bit rate. In other words, the client selects a bit rate for downloading the first segment which is slightly higher than one of the given media bit rate candidates, e.g. slightly higher than the lowest media data rate candidate.

In step 504, after receiving feedback information indicating that the available bit rate has changed, the manipulating component 204 manipulates the manifest file. In detail, the manipulating component 204 manipulates the manifest file by adjusting the media bit rate candidates based on the changed available bit rate between the server and the clients and transmits the manipulated manifest file to the client. Then, the second segment is downloaded by the client. For this purpose, the client selects a media bit rate from the media bit rate candidates in the manipulated manifest file and downloads the second segment with a bit rate which is slightly larger than the selected media bit rate. These steps can be continued until all content segments of the requested content stream have been downloaded by the client.

Figure 6:
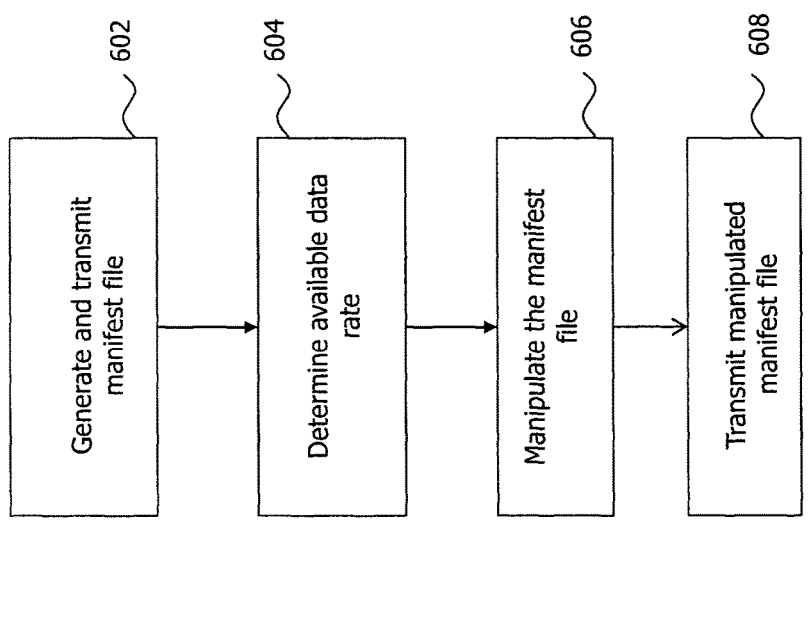
FIG. 6 is a schematic illustration of a second method embodiment.

FIG. 6 shows a flow diagram of a second method embodiment. In step 602, the generating component 202 of the server 200 generates and transmits a manifest file to the client requesting a particular content stream from the server 200. The manifest file comprises multiple media bit rate candidates for each content segment of each content stream. Further, the manifest file may comprise information indicating the download location of the content segments, e.g. a particular URL. In this way, the client receiving the manifest file can derive the download location of the content segments of the content stream and can start downloading the content segments in accordance with the location information.

As stated above, a plurality of media bit rate candidates are assigned to each of the content segments. The values of the media bit rate candidates may vary from content segment to content segment of one content stream, but may also stay the same. Likewise, the number of media bit rate candidates may vary from content segment to content segment, but may also stay the same. The manifest file is received by the client which can then start downloading the content segments in accordance with the information given in the manifest file.

Further, the values of the media bit rate candidates may vary from content stream to content stream, thereby assigning different possible media bit rates to different content streams. However, it is very well conceivable that at least a subset of the media bit rate candidates of different content streams are at least similar or the same. Likewise, the number of media bit rate candidates of different content streams may be different or the same.

Independent of the exact configuration of the media bit rate candidates, the available bit rate along the link from the server 200 to the clients served by the server 200 is determined in step 604. For example, it can be determined in step 604 that the available bit rate along the link between the server 200 and the clients has changed. In this case, the manipulating component 204 manipulates the manifest file in step 606 by adjusting the media bit rate candidates based on the (new) available bit rate along the link. For instance, the server 200 receives the information via its receiving component 206 that the new available bit rate has changed and is now lower than the previous bit rate. In this case, the manipulating component 204 deletes the media bit rate candidates in step 606 which are higher than the new available bit rate. Alternatively, the server 200 receives the information via its receiving component 204 that the new available bit rate has changed and is now higher than the previous bit rate. In this case, the manipulating component 204 adds further media bit rate candidates in step 606 which fulfil the condition that they are lower than the new available bit rate.

An easily implemented approach in step 606 is to avoid having fluctuations in media quality/media bitrate. Therefore the highest possible media bit rate may be removed from each of the available options (each of the media bit rate candidates for the content segments). This helps, from a (radio) network perspective, to maximize the total number of satisfied users.

The manipulated manifest file is then transmitted in step 808 to the client which downloads the content segments in accordance with the new information provided in the manipulated manifest file.

Figure 7:
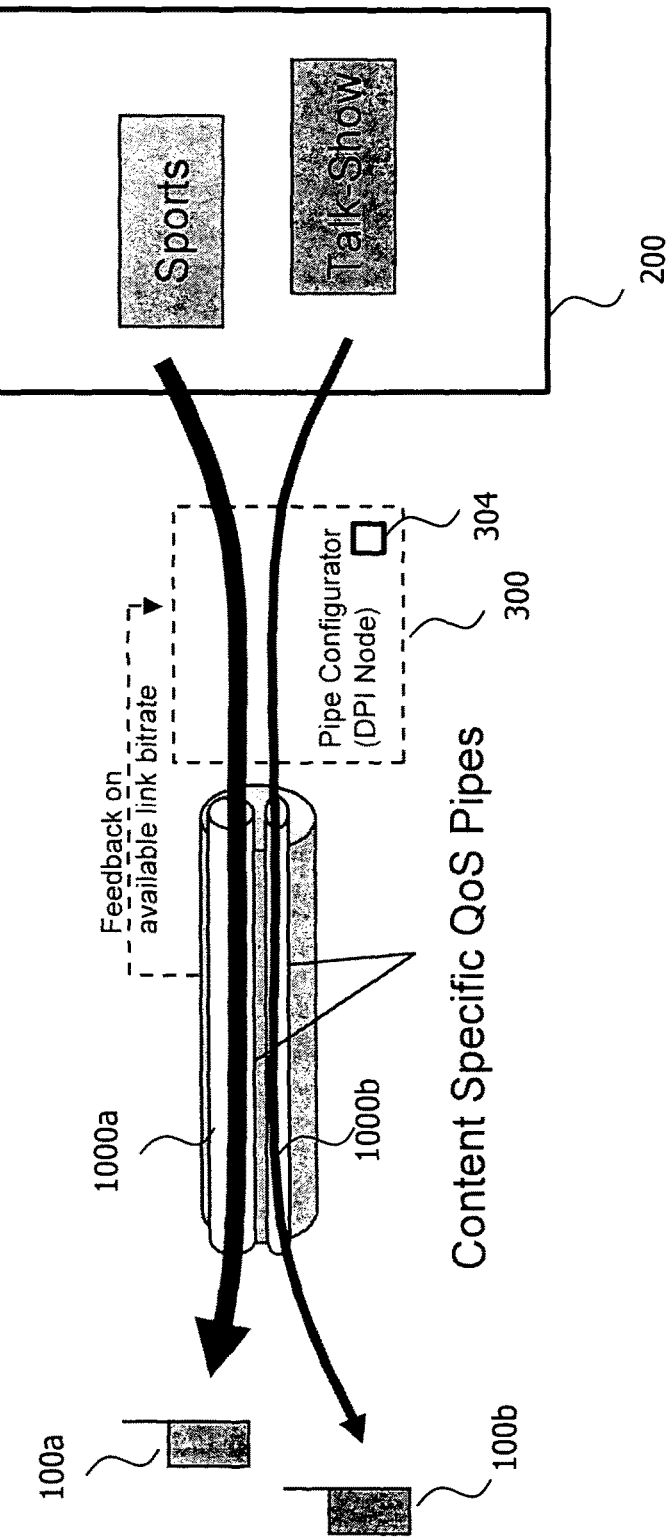
FIG. 7 is a schematic illustration of a first system embodiment for transmitting different media content.
Figure 8:
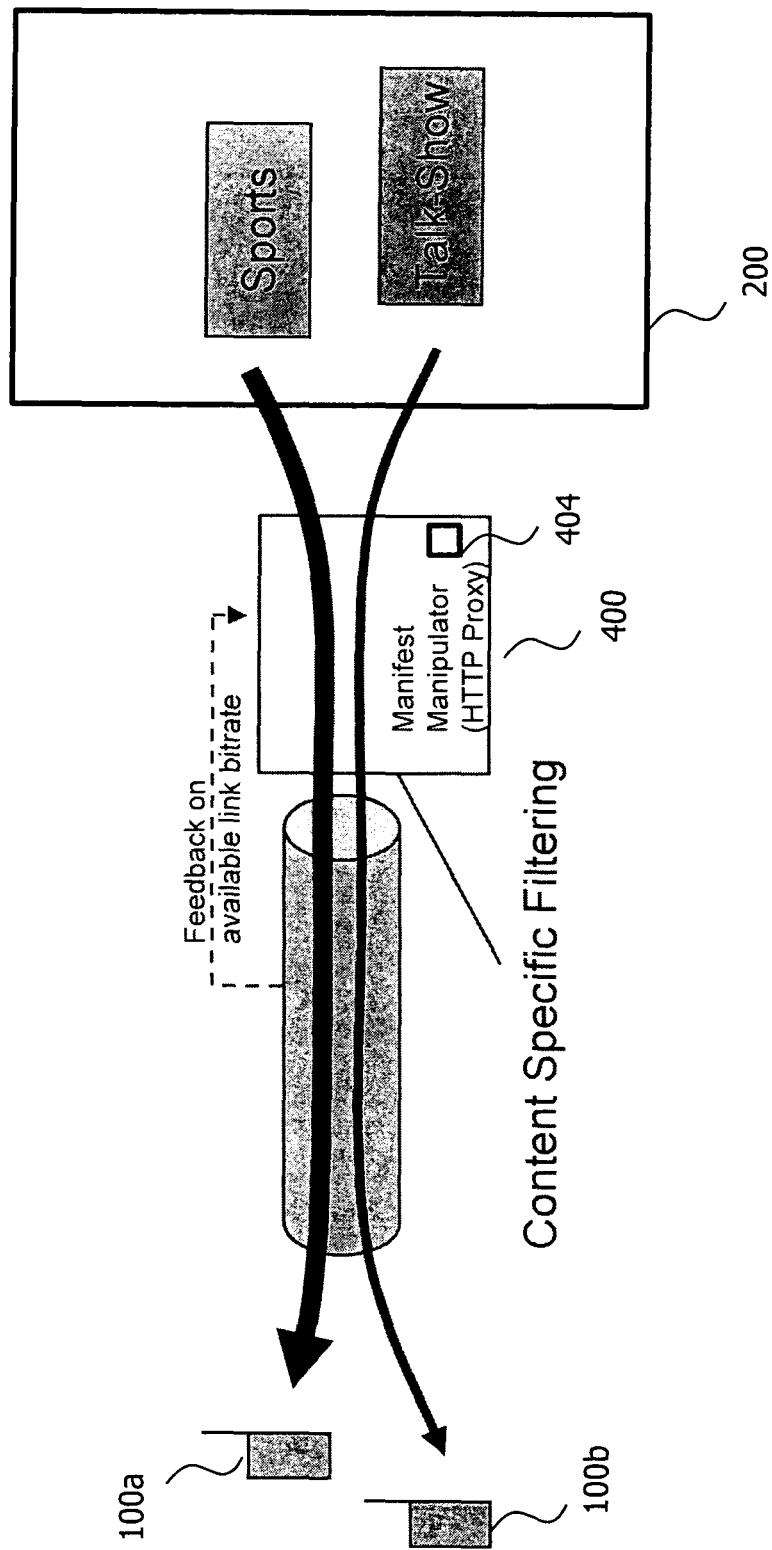
FIG. 8 is a schematic illustration of a second system embodiment for transmitting different media content.

In FIG. 7, a first system embodiment is illustrated. Likewise, FIG. 8 shows a second system embodiment. FIG. 7 and FIG. 8 both show two mobile terminals 100*a*, 100*b* and a server 200. The mobile terminals 100*a*, 100*b* are an example for mobile clients. The server 200 provides different types of media content streams. As exemplarily and without limitation illustrated in FIGS. 7 and 8, the server 200 provides a sports content stream and a talk-show content stream. A first client, which is exemplarily and without limitation illustrated as a first mobile terminal 100*a* of the two mobile terminals, requests download of the sports content stream and a second client, which is exemplarily and without limitation illustrated as a second mobile terminal 100*b* of the two mobile terminals, requests download of the talk-show content stream from the server 200.

As described above, the bit rate needed for a certain quality varies wildly with the type of content. It is therefore not optimal to provide everyone with a stream of the same media bit rate. Thus, if the sports content stream and the talk-show content stream would be transmitted with the same bit rate, the perceived quality of the two contents at the mobile terminals 100*a*, 100*b* would be different. The media bit rate needed for a certain quality is low for talk shows, and high for sports. In other words, in order to achieve the same perceived quality, the sports content stream needs a higher media bit rate and thus has to be transmitted with a higher bit rate than the talk show content stream.

This is reflected in the bit rates provided as media bit rate candidates in the present examples of FIGS. 7 and 8. For example, the media bit rate candidates for sports content segments are 0.5, 0.7, and 1.0M bps in the originally generated manifest file, while they are 0.2, 0.3 and 0.5M bps for talk show content segments in the originally generated manifest file, for achieving similar or corresponding (same) quality levels.

In accordance therewith, in the first system embodiment shown in FIG. 7, the Deep Packet Inspection (DPI) node 300 in FIG. 7, provides a reduced list of representations, i.e. media bit rate candidates of reduced values, when the server 200 or the DPI node 300 is aware about congestion on the link to the mobile terminals 100a, 100b. For this purpose, the DPI node 300 can maintain a manipulating component 304 as described above with respect to the server 200. FIG. 8 only differs from the system of FIG. 7 in that a HTTP proxy 400 is used instead of the DPI node 300. Like the DPI node 300, the HTTP proxy 400 can contain the manipulating component 404 instead of the server 200. Thus, the following and the above equally applies to both the system of FIG. 7 and the system of FIG. 8.

For example, the manipulating component 204 in the server or the manipulating component 304 in the DPI node 304 or the manipulating component 404 in the HTTP proxy 400 deletes some of the media bit rate candidates because a change in the available bit rate has been determined. For example, the highest value of the media bit rate candidates is deleted and thus only the representations 0.5 and 0.7M bps for sports, and 0.2 and 0.3 Mbps for talk shows are still contained in the manipulated manifest file. Different realizations are possible for determining the available link bit rate. According to a first example, an intermediate node (the DPI node 300 or the HTTP proxy 400) modifies the manifest file (e.g. MPD) based on network feedback about the currently available link bit rate. According to a second example, the manipulating component 304, 404 (e.g. a Manifest Manipulator box) considers long term network statistics (e.g. certain cells are typically loaded to X % between 1500 h (3 pm) and 1600 h (4 pm)).

For generating the manifest file, the following can be implemented in the server 200, the DPI node 300 or the HTTP proxy 400. In order to simplify the type of content (sports or music with high movements and quick, hard cuts versus talk-shows and news with large static parts and low movements), the manifest file (like DASH MPD or HLS m3u8) can extended with a category or a mos-scale attribute.

The category attribute orders the content streams in terms of its categories, e.g. whether the content streams contain high movements or low movements (and thus require high bit rate or low bit rate). Different or more category types are also conceivable. In the present example given in FIGS. 7 and 8, the sports content stream is assigned to category one and the talk show content stream is assigned to category two. The generating component 202 can now assign the respective media bit rate values to the respective media bit rate candidates of the content streams in accordance with the category. That is, the generating component 202 assigns different values to the category one stream than to the category two stream. In this way, the perceived quality can be fairly balanced. If the available bit rates over the link change, the manipulating component 204, 304, 404 adjusts the bit rates in accordance therewith. For this purpose, the system has to be aware about the on-going streaming sessions. This can be achieved through DPI performed by the DPI node 300 or by the HTTP proxy 400 which can be either transparent or none-transparent.

Instead or ordering the content streams in categories, a mos-scale attribute can be used in the manifest file. By setting in the manifest file a MOS score for the mos-scale attribute, the manifest file can be generated such that content streams having the same MOS value are assigned the same media bit rate candidates, while content streams having different MOS values are assigned different media bit rate candidates. An intermediate node, like the DPI node 300 and the HTTP proxy 400, can easily decide, which media bitrates lead to a fair distributed Quality of Experience (in terms of MOS score) among the on-going streams. Thus, by estimating the QoE in terms of MOS for the content streams, the DPI node 300 or the HTTP proxy 400 can adjust the download speed candidates based on the estimated QoE (MOS values).

Further, the encoder can provide metadata on the perceived quality, e.g. on the MOS, of the content streams. The same perceived quality value of sports content and news content will lead to different media bit rates. In other words, sports content require a (much) higher media bit rate.

In the example of FIGS. 7 and 8, the DPI node 300 or the HTTP proxy 400 determine which bit rates are necessary for the sports content stream and the talk show content stream to achieve the same MOS score. These bit rates are then mapped to the respective MOS score. Thus, the system can know a mapping (utility function) between the media bit rate and the resulting QoE (or MOS score). In this way, when selecting the same MOS score, at least a similar if not the same perceived quality will be achieved for both content streams at the mobile terminals 100a, 100b, although the content streams are downloaded with different bit rates.

These different bit rates are schematically illustrated in FIGS. 7 and 8 by two (virtual) content specific QoS pipes 1000a, 1000b. These pipes 1000a, 1000b illustrate that the sports content stream requires a higher bitrate in order to achieve the same MOS score as the talk show stream. In accordance therewith, the bit rate for the sports content stream usually has to be higher which is illustrated by the bigger pipe 1000a.

In this way, a generic realization of QoE-optimized application-layer adaptation is provided by avoiding changing the signaling to the client (mobile terminals 100a, 100b) at all, and instead varying the link bandwidth in a controlled manner. In particular, the QoS-attributes which contain bitrate, delay, and packet-loss figures, can be extended with QoE metrics, for example, five different bandwidths with five corresponding MOS scores. Then, the scheduler can schedule for even distribution of MOS instead of even distribution of bandwidth.

In this way, the system of FIGS. 7 and 8 combines the information about the available link bitrate with the knowledge about the on-going streaming sessions and the needed media bit rate (per stream) for a given QoE (or MOS score).

It is believed that many advantages of the current invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of adjusting a download of a content element, wherein the content element is provided in a network by a server for streaming and the content element comprises a plurality of content segments, the method comprising:
   a network node selecting a first set of media data rates for the content element, wherein the selection of the first set of media data rates for the content element is based on one or more of: a category to which the content element is assigned and a perceived quality of the content element, wherein the perceived quality comprises a Quality of Experience (QoE) of the content element;

the network node generating a first manifest file for the content element, wherein the first manifest file comprises a first set of media data rate identifiers, wherein each one of said media data rate identifiers included in the first set of media data rate identifiers identifies a different one of the media data rates included in the first set of media data rates;

the network node transmitting the first manifest file to a client that is remote from the network node;

after transmitting the first manifest file to the client, the network node receiving from the client a first request for a first content segment of the content element;

the network node determining a first available link data rate for a link between the server and the client;

after determining the first available link data rate, the network node determining a second available link data rate for the link between the server and the client; and after the client sends to the server the first request for the first content segment of the content element and before the client sends to the server a second request for a second content segment of the content element, performing the following three (3) steps:

(1) the network node selecting a second set of media data rates for a modified manifest file for the content element based on the determined second available link data rate for the link between the server and the client;

(2) the network node, after selecting the second set of media data rates, generating the modified manifest file for the content element, wherein the modified manifest file comprises a second set of media data rate identifiers, wherein each one of said media data rate identifiers included in the second set of media data rate identifiers identifies a different one of the media data rates included in the second set of media data rates, and further the modified manifest file does not include one of the media data rate identifiers included in the first manifest file or includes a new media data rate identifier that is not included in the first manifest file; and (3) the network node transmitting to the client the modified manifest file.

2. The method of claim 1, wherein generating the modified manifest file comprises removing from the first manifest file all media data rate identifiers that identify a media data rate that lies above a selected media data rate threshold.

3. The method of claim 2, wherein the step of determining the second available link data rate is based on at least one of real-time statistics indicating a current load between the server and the client and long term statistics indicating a typical load between the server and the client during a predetermined time period.

4. The method of claim 2, further comprising the network node, which is remote from the client, selecting the media data rate threshold based on the determined second available link data rate.

5. The method of claim 1, wherein the QoE comprises a Mean Opinion Score (MOS) of the content element.

6. The method of claim 1, wherein the method further comprises: (1) determining an amount of movement in the content element; (2) comparing the determined amount of movement to a movement threshold; and (3) assigning the content element to a first category when the determined amount of movement in the content element exceeds the movement threshold, and the selection of the first set of media data rates for the content element is based on the category to which the content element is assigned.

7. The method of claim 6, wherein the selection of the first set of media data rates for the content element is based on both of the category to which the content element is assigned and the perceived quality of the content element, wherein the perceived quality comprises a Quality of Experience (QoE) of the content element.

8. The method of claim 1, wherein the content element is one of a sports content stream, a news content stream, a talk show content stream and a movie content stream.

9. The method of claim 1, wherein the step of generating a modified manifest file for the content element is repeatedly performed.

10. The method of claim 1, wherein the streaming between the server and the client comprises Hypertext Transfer Protocol (HTTP) streaming.

11. The method of claim 1, further comprising:

determining whether the second available link data rate is different than the first available link data rate, wherein the step of the network node selecting the second set of media data rates for the modified manifest file for the content element is performed as a result of the network node determining that the second available link data rate is different than the first available link data rate.

12. The method of claim 1, further comprising:

determining a difference between the second available link data rate and the first available link data rate, wherein the step of the network node selecting the second set of media data rates for the modified manifest file for the content element comprises the network node selecting the second set of media data rates based on the determined difference between the second available link data rate and the first available link data rate.

13. A computer program product comprising a non-transitory computer readable medium storing program code portions for performing the method of claim 1.

14. A network node for adjusting a download of a content element, wherein the content element is provided in a network by a server for streaming and the content element comprises a plurality of content segments, the network node comprising:

a memory; and at least one processor coupled to the memory, wherein the node is configured to:

select a first set of media data rates for the content element, wherein the selection of the first set of media data rates for the content element is based on one or more of: a category to which the content element is assigned and a perceived quality of the content element, wherein the perceived quality comprises a Quality of Experience (QoE) of the content element;

generate a first manifest file for the content element, wherein the first manifest file comprises a first set of media data rate identifiers, wherein each one of said media data rate identifiers included in the first set of media data rate identifiers identifies a different one of the media data rates included in the first set of media data rates;

transmit the first manifest file to a client that is remote from the network node;

after transmitting the first manifest file to the client, receive from the client a first request for a first content segment of the content element determine a first available link data rate for a link between the server and the client;

after determining the first available link data rate, determining a second available link data rate for the link between the server and the client; and the node is configured to perform the following three steps after the client sends to the server the first request for the first content segment of the content element and before the client sends to the server a second request for a second content segment of the content element:

(1) selecting a second set of media data rates for a modified manifest file for the content element based on the determined second available link data rate for the link between the server and the client;

(2) after selecting the second set of media data rates, generating the modified manifest file for the content element, wherein the modified manifest file comprises a second set of media data rate identifiers, wherein each one of said media data rate identifiers included in the second set of media data rate identifiers identifies a different one of the media data rates included in the second set of media data rates and the modified manifest file does not include one of the media data rate identifiers included in the first manifest file or includes a new media data rate identifier that is not included in the first manifest file; and (3) transmitting to the client the modified manifest file.

15. The network node of claim 14, wherein the network node comprises the server.

16. The network node of claim 15, wherein the network node comprises an intermediate network node between the server and the client.

17. The network node of claim 16, wherein the intermediate network node is a Deep Packet Inspection (DPI) node which is adapted to determine the available link data rate by means of DPI or wherein the intermediate network node is a HTTP proxy.

* * * * *